United States Patent [19]

Kimmerle et al.

[11] 4,388,149

[45] Jun. 14, 1983

[54] TITANIUM COATED ASBESTOS FIBER

[75] Inventors: Frank M. Kimmerle; Pierre Roberge, both of Sherbrooke, Canada

[73] Assignee: Societe Nationale de L'Amiante, Quebec, Canada

[21] Appl. No.: 310,722

[22] Filed: Oct. 13, 1981

[51] Int. Cl.³ .............................................. D21H 5/18
[52] U.S. Cl. .................. 162/153; 162/181.5; 162/183; 427/218; 427/372.2; 428/361; 428/384; 428/444
[58] Field of Search .................. 428/361, 384, 444; 427/372.2, 218; 162/3, 153, 183, 181.5; 204/295; 106/308 B

[56] References Cited

U.S. PATENT DOCUMENTS

| | | | |
|---|---|---|---|
| 2,833,620 | 5/1958 | Gier et al. | |
| 3,458,393 | 7/1969 | Battista | 162/3 |
| 3,553,001 | 1/1971 | Kohlschutte et al. | 427/218 |
| 3,689,430 | 9/1972 | Yates | 162/3 |
| 3,847,762 | 11/1974 | Strain | 204/295 |
| 3,891,461 | 6/1975 | Harada et al. | 136/86 E |
| 3,914,184 | 10/1975 | Harada et al. | 252/457 |
| 3,914,185 | 10/1975 | Inamorato | 252/546 |
| 3,939,055 | 2/1976 | Foster | 204/295 |
| 3,944,477 | 3/1976 | Argade | 204/266 |
| 3,947,286 | 3/1976 | Myers et al. | 106/286 |
| 3,979,276 | 9/1976 | Strain | 204/295 |
| 3,991,251 | 11/1976 | Foster et al. | 428/289 |
| 4,093,533 | 6/1978 | Beaver et al. | 204/296 |
| 4,142,951 | 3/1979 | Beaver et al. | 204/296 |
| 4,169,774 | 10/1979 | Kadija et al. | 204/98 |
| 4,180,449 | 12/1979 | Heillel | 204/295 |

*Primary Examiner*—William F. Smith
*Attorney, Agent, or Firm*—Cushman, Darby & Cushman

[57] ABSTRACT

The invention relates to a chrysotile asbestos fiber substantially coated on its exterior surface with hydrated titanium dioxide, the titanium dioxide content being from 0.5 to 35% by weight, part of the titanium dioxide being chemically bonded to the asbestos fiber and the remaining titanium dioxide being retained by electrostatic bond, said modified fiber having an Mg:Si ratio of from less than 3:2 to 2:2 when calculated on an atomic number ratio, a Ti:Si ratio of from more than 0:2 to less than 1:2 and said modified fiber being also characterized by an infrared spectrum wherein the relative peaks at 1082, 1025 and 957 cm$^{-1}$ have been substantially altered in their intensity and as shown in curves C and D of FIG. 1, said fiber resisting leaching of the Mg ions by strong acids 3 to 6 times better than natural asbestos fibers and resisting leaching of SiO$_2$ groups in strong alkali media 1.5 to 3 times better than unmodified chrysotile fibers. The novel titanated fibers are useful in the manufacture of diaphragm for separating the electrode compartments of electrolytic cells.

6 Claims, 7 Drawing Figures

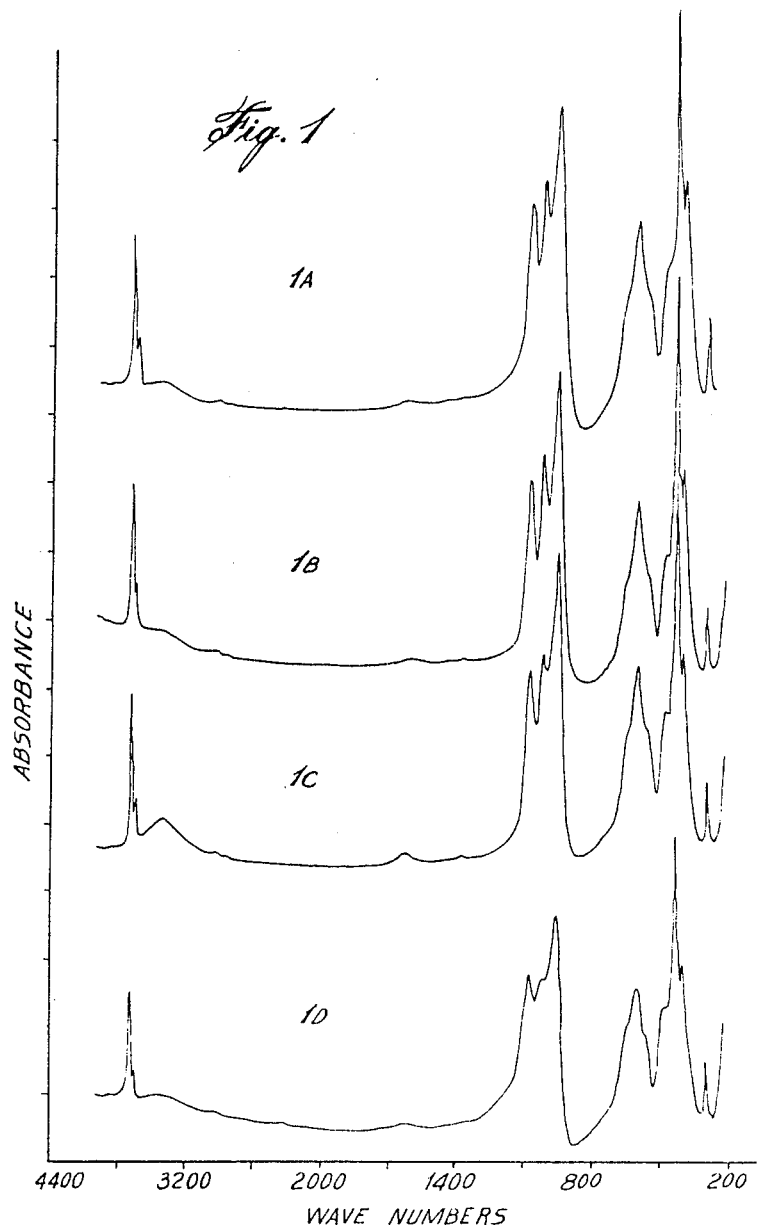

Fig. 2 Chrysotile asbestos Example 1A
Fig. 3 Chrysotile asbestos treated as in Example 1F
Fig. 4 Chrysotile asbestos modified as in Example 1C
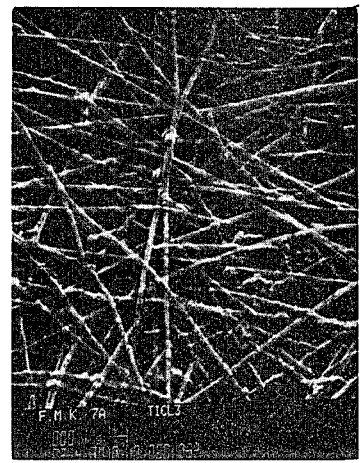
Fig. 5 Chrysotile asbestos modified as in Example 1B

Fig. 6 Chrysotile asbestos modified as in Example IE
Fig. 7 Chrysotile asbestos modified as in Example ID

TITANIUM COATED ASBESTOS FIBER

The present invention relates to a modified asbestos fiber particularly suitable for use in the manufacture as a diaphragm for separating the electrode compartments of electrolytic cells because of the improved resistance of the treated asbestos fibers to acid and/or alkali attack.

PRIOR ART

Asbestos diaphragms or separators have been found useful for use in electrolytic cells to divide the anode compartment from the cathode compartment. Since asbestos fibers including chrysotile fibers are attacked in very alkaline and acid media, attempts have been made to treat asbestos fibers so as to increase their resistance to attack in an alkaline and acid medium normally present in the respective compartment of electrolytic cells. Presently available asbestos diaphragm used in electrolytic cells have to be replaced about every six months due to their attack by acid and alkali.

In electrolytic cells designed to operate in concentrated alkaline media, such as used for the electrolysis of water or as $H_2/O_2$ fuel cells, the normal asbestos diaphragm performs well below 100° C., but is subject to chemical attack at higher temperatures (U.S. Pat. No. 3,914,184, Harada et al.) Alternate mineral fibers including fibrous potassium titanate (U.S. Pat. No. 3,891,461, Harada et al.) bonded with polymerized tetrafluoroethylene have been proposed as substitute separator materials since they are suitable resistant in alkaline media at intermediate temperatures and reasonably resistant in acid electrolyte.

In other cells, such as those used in the $Cl_2$/NaOH production, the asbestos diaphragm is continously exposed to an acidic medium. The chrysotile asbestos diaphragm is so severely leached by the anolyte that it normally needs to be replaced every six months. Different measures have been suggested to minimize this chemical attack including incorporation of acid resistant varieties of asbestos, of organic or mineral fibers, the addition of powders or solutions containing silicates, chemical and heat treatments to form an alkali metal silicate layer on the asbestos fibers and bonding of the fibers with various fluorocarbon polymers or combinations thereof.

Titanated asbestos fibers have been prepared by treating a slurry of highly purified chrysotile asbestos fibers with titanium dioxide. In this procedure, the coating of asbestos fibers was done through an electrostatic bonding of titanium dioxide particles as disclosed in U.S. Pat. No. 3,947,286. Nevertheless in this procedure, very short fibers unsuitable as a filter material are used and the surface of the fibers are not completely coated so as to afford little protection against acid attack, so that the fibers trated according to the procedures outlined in U.S. Pat. No. 3,947,286 would not be highly desirable in the manufacture of electrolytic diaphragms. U.S. Pat. No. 4,180,449 teaches a procedure for preparing improved diaphragm and mat containing asbestos prepared by bonding the asbestos fibers to one another by pyrolyzing an organic titanate 'in situ'. It does not claim to afford any chemical protection of the chrysotile fibers themselves.

As well as possessing dimensional stability, it is believed that desirable modified asbestos fiber diaphragms and mats must possess substantial resistance to attack by the acidic anolyte in the chlore-alkali cell so as to reduce to a minimum the precipitation of magnesium hydroxide which tends to block the pores of diaphragm.

SUMMARY OF THE INVENTION

In accordance with the present invention there is now provided a novel chrysotile asbestos fiber which is substantially coated on its exterior surface with hydrated titanium dioxide. The thus modified asbestos fiber is characterized by having a titanium dioxide content of from 0.5 to 35% by weight. The modified asbestos fiber of the present invention is also characterized by having part of the titanium dioxide chemically bonded to the fiber while the remaining titanium dioxide is retained on the fiber by an electrostatic bond. The modified asbestos fiber is further characterized by having an Mg:Si ratio of from less than 3:2 to 2:2 when calculated on an atomic number ratio, a Ti:Si ratio of from more than 0:1 to less than 1:2 and by having an infrared spectrum characterized by having the intensity of the relative peak at 1082, 1025 and 957 cm$^{-1}$ altered as shown in curves C and D of FIG. 1.

Furthermore, the novel chrysotile asbestos fibers of the present invention, because a major portion of the titanium dioxide is chemically bonded to the asbestos fibers, are further characterized by an increased resistance of 3 to 6 times that of natural asbestos fibers to leaching of the magnesium ions by strong acids and an increased resistance of 1.5 to 3 times that of natural asbestos fibers to leaching of $SiO_2$ groups in strong alkali media.

Consequently, the modified asbestos fibers of the present invention, because of their desirable resistance to leaching, are suitable for applications over a wider pH range than untreated fibers and are thus particularly useful in the manufacture of diaphragms or separators for use in electrolytic cells.

The novel titanated asbestos fibers of the present invention have also been found to have a Zeta potential of about 15 mV more negative than untreated asbestos fibers.

Essentially, the novel chrysotile asbestos fibers chemically bonded to titanium dioxide of the present invention are prepared by the oxidation of $Ti^{+++}$ to $Ti^{++++}$ by water catalyzed by the surface of the asbestos fibers in the absence of oxygen or by the oxidation of $Ti^{+++}$ to $Ti^{++++}$ by the oxygen adsorbed on the surface of asbestos fibers.

The features of the present invention are best illustrated by reference to the drawings in which:

FIG. 1 represents the superimposition of four infrared spectra of titanated and non-titanated asbestos fibers;

FIG. 2 is an electron microscope photograph of asbestos fibers prepared according to Example 1A;

FIG. 3 is an electron microscope photograph of asbestos fibers reacted with an organic titanate;

FIG. 4 is an electron microscope photograph of titanated asbestos fibers prepared by a process of the present invention;

FIG. 5 is an electron microscope photograph of titanated asbestos fibers prepared in accordance with a further process of the present invention;

FIG. 6 is an electron microscope photograph of titanated asbestos fibers of FIG. 5 which have been heated to 425° C.; and FIG. 7 is an electron microscope photograph of titanated asbestos fibers of FIG. 4 which have been heated to 425° C.

DESCRIPTION OF THE INVENTION

The modified asbestos fibers of the present invention can be obtained by reacting titanium trichloride with the asbestos fibers in the presence of water, preferably at a pH less than 5, and preferably in the absence of oxygen. It is believed that the reaction can be depicted to proceed as follows:

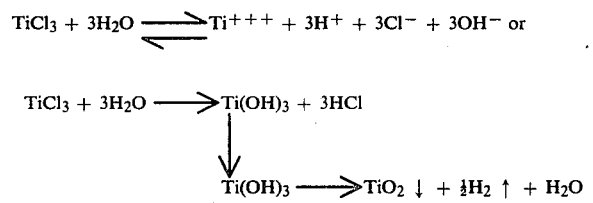

It is believed that the above illustration is in order since it is known that the trivalent titanium ion is stable in aqueous oxygen-free solution as long as the medium remains sufficiently acid. This stability decreases rapidly with the increase of the pH of the solution where the transformation of the chloride into oxide is believed to take place by the corresponding reduction of the water as illustrated above.

In practice this decomposition of the reagent is very slow. For example at room temperature for an initial pH of 3.9 it takes three hours to start and five days to complete. As soon as a solution of titanium trichloride is placed in contact with asbestos fibers the evolution of hydrogen is noted. This reaction, which is catalyzed by the asbestos fibers, will proceed faster as the starting solution titanium trichloride is neutralized to a pH of from 3 to 4 before the addition of the asbestos fibers, or the temperature is increased to less than 100° C.

Generally speaking the amount of trivalent titanium salt will vary from 1 to 50% by weight of the asbestos fiber. Obviously, for economic reasons the lower range of 1 to 25% by weight is used while the range of 25 to 50% is used when it is desired to provide a product having a higher resistance to acid leaching.

As far as the size of the chrysotile asbestos fibers is concerned, any length can be used, but preferably those fibers having a surface area from 3 to 30 m²/g. When using short fibers having a large surface area, the reaction proceeds more quickly, while with longer fibers having generally a lower surface area, the reaction takes a longer time but a more homogenous coated fiber is obtained.

As far as the trivalent titanium salt is concerned TiCl₃ is preferred but any Ti(III) compound which can be hydrolized can be employed. In the above reaction, it is noted that since Ti(III) solutions, including titanium chloride in solution, have an acid pH, it is preferred that the solution be partially neutralized so as to reduce the possibility of leaching of the asbestos fibers thereby liberating some magnesium.

A harder, less flexible and thus easier to manipulate product suitable as a diaphragm for electrolytic cells is obtained when the formed diaphragm is subjected to a temperature of less than 450° C. for a period of time varying from 20 minutes to several hours.

The present invention will be more readily understood by referring to the following Examples which are given to illustrate the invention only rather than limit its scope.

EXAMPLE 1A

Using a rotary screen wet classifier chrysotile fibers 75 to 400 μm long were isolated from a 0.1% aqueous suspension of short commercial grade asbestos (Grade 7 Quebec Asbestos Mining Association). Thermogravimetric analysis indicated that these fibers consisting of 96.7±0.5% chrysotile, 2.0±0.2% brucite, 1.0±0.2% magnesite with negligible amounts of magnetite or other impurities are particularly useful for the characterization of physico-chemical modifications. The fibers were mechanically opened by a high speed agitation of a 5% slurry and dispersed as a 2% slurry by air sparging for several hours before chemical treatment as outlined below.

EXAMPLE 1B

Titanated asbestos fibers were produced as follows:
4.8 g of TiCl₃ dissolved in 25 ml deoxygenated water were added to 1 liter of a deoxygenated 2.0 weight percent slurry of chrysotile fibers isolated according to the procedure of Example 1A. The slurry which had a pH of 0.5 to 1.0 was stirred for several hours at room temperature until hydrogen evolution ceased. All water and the fibers themselves were deoxygenated by applying a slight vacuum and the reaction carried out under a nitrogen atmosphere. After air sparging, the slurry was deposited as a mat under vacuum filtration and subsequently dried at 100° C.

Proceeding in the same manner and using deoxygenated water and using ordinary asbestos fibers instead of deoxygenated asbestos fibers, similar results are obtained.

EXAMPLE 1C 25 ml of an aqueous 2.5 N NaOH solution were added to 4.8 g of TiCl₃ dissolved in 25 ml deoxygenated water. The resulting suspension pH 3.7–3.9 was added to 2.0 weight percent slurry of chrysotile asbestos fibers and treated as in Example 1B.

EXAMPLE 1D

The asbestos mat formed according to the procedure of Example 1B was dried at 110° C. for two hours and then heated at 425° C. for twenty minutes.

EXAMPLE 1E

The asbestos mat formed according to the procedure of Example 1C was dried at 110° C. for 2 hours and then heated at 425° C. for 20 minutes.

EXAMPLE 1F

Asbestos fibers bond together by pyrolyzing an organic titanate 'in situ' was prepared in accordance with Example 5 or U.S. Pat. No. 4,180,449 as follows:
10 g of chrysotile fibers isolated according to the procedure of Example 1A were dispersed by air sparging in 2 liters water for 24 hours and with the aid of a slight vacuum deposited as a uniform mat in a Buchner funnel. The diaphragm thus formed was immersed in a solution containing 5 g of tetraisopropyl titanate, 1 g of 36% HCl and 94 g of isopropanol, the excess solution drained and the mat then heated at 425° C. for 20 minutes.

EXAMPLE 1G 10 g of chrysotile asbestos fibers were mixed with 1.2 g of rutile titanium oxide and dispersed by air sparging in 2 liters water. The slurry was further agitated by air sparging for 24 hours, and with the aid of a slight vacuum deposed as a uniform mat in a Buchner funnel.

CHARACTERIZATION OF THE PRODUCTS OF EXAMPLES 1A TO 1G

Infrared Spectrum

The treated and untreated fibers were examined by scanning electron microscopy and IR spectroscopy. The IR spectrum of the fibers treated according to Example 1F (as taught by U.S. Pat. No. 4,180,449) shown in curve B of FIG. 1 is practically identical to the IR spectrum obtained for the pure native fibers classified according to the procedure of Example 1A and shown in curve A of FIG. 1. However, the spectra of the fibers treated according to Example 1E (curve C of FIG. 1) and according to Example 1D, (curve D of FIG. 1) show a progressive decrease of the intensity of the silicate band at 1025 cm$^{-1}$ tabulated in Table 1. This decrease has been associated with a decrease of the cytotoxicity of chrysotile fibers when measured in accordance with the procedure described by Langer, A.M. et al. in J. Toxicol. Environ. Health 4, 173–188 (1978) and is due to an exchange of the magnesium atoms which is 8% in Example 1D and 25% in Example 1E as measured by atomic absorption spectrometry. Also noticeable are slight shoulders at 1210 cm$^{-1}$ and 790 cm$^{-1}$ which can be attributed to TiO$_2$. The IR spectra of products of Example 1D and Example 1E heated to 425° C. were practically identical to those of EXAMPLES 1B and 1C and dried at 110° C. before analysis. Even the bands at 3400 cm$^{-1}$ and 1650 cm$^{-1}$ associated with physisorbed water did not vary significantly.

TABLE 1

| | Relative Absorbance with respect to OH peak at 3690 cm$^{-1}$ | | | | | | |
|---|---|---|---|---|---|---|---|
| Example | λ (cm$^{-1}$) | A | λ (cm$^{-1}$) | A | λ (cm$^{-1}$) | A | $\frac{A(1025\ cm^{-1})}{A(1082\ cm^{-1})}$ |
| 1A | 1082 | 1.2356 | 1023 | 1.56 | 957 | 2.14 | 1.14 |
| 1D | 1082 | 1.63 | 1023 | 1.64 | 961 | 2.21 | 1.00 |
| 1E | 1081 | 1.36 | 1026 | 1.47 | 960 | 2.12 | 1.07 |
| 1F | 1082 | 1.49 | 1025 | 1.66 | 957 | 2.18 | 1.11 |

Microscopic Examination

Optical microscopy confirms that Example 1G yields a simple mixture of TiO$_2$ particles and asbestos fibers. The chrysotile fibers are surrounded by a large number of TiO$_2$ particles some of which seem to be held onto the fibers, possibly by electrostatic interactions. The smaller amounts of TiO$_2$ and the small particle size in Example 1B and Example 1C necessitate the use of an electron microscope in order to detect any visible changes.

FIG. 2 and FIG. 3 show that the morphology of the fibers of Example 1A and those of the treated fibers of Examples 1F are not altered. It will be observed in these two figures that no significant bonding of the monofibrils appear to have taken place.

On the other hand FIG. 4 shows that the treatment of asbestos fibers with TiCl$_3$ at a pH of from 3 to 4 provides a product with larger particles of titanium dioxide than the process operating at a lower pH as shown in FIG. 5 (Example 1B) where small titanium dioxide particles of the order of 0.01 μm in diameter appear to be bound to the fibers thus giving them a rugged appearance. On the other hand when the products obtained in Examples 1B and 1C are subjected to a heat treatment at 425° C. as per Example 1D and 1E the heat treated fibers tend to agglomerate as can be observed from FIGS. 7 and 6 respectively.

The fibers treated with TiCl$_3$ according to Examples 1B, 1C, 1D and 1E have been chemically opened as shown by the increased number of monofribrils in FIGS. 4, 5, 6 and 7 compared with those in FIG. 2 and FIG. 3. Furthermore, Energy Dispersive X-ray Analysis, EDAX, confirms that a partial leaching of Mg has taken place reducing the Mg/Si atomic number ratio from 3:2 to an average value of 2.5:2 while increasing the Ti/Si atomic number ratio from 0.0:2 to an average value of 0.5:2 as indicated in Table 2. Treatment according to Example 1F leads to the incorporation of about 1% by weight of TiO$_2$ with considerably greater heterogeneity than treatments according to Examples 1B to 1E.

TABLE 2

| Atomic Number Ratio as calculated from EDAX peak intensities | | | |
|---|---|---|---|
| Fiber Treatment | Mg/Si (reproducibility) | | Ti/Si (reproducibility) |
| Example 1A | 1.50 | (±1.3%) | 0.007 (±25%) |
| " | 1.21 | (±2.8%) | 0.22 (±2.5%) |
| " | 1.29 | (±1.0%) | 0.25 (±9.0%) |
| " | 1.25 | (±2.1%) | 0.21 (±4.0%) |
| " | 1.23 | (±4.4%) | 0.23 (±12.0%) |
| " | 1.50 | (±1.5%) | 0.016 (±32.0%) |

EXAMPLE 2

1.0 g of chrysotile asbestos fibers classified according to Example 1A or modified according to the procedure of Examples 1B and 1F were mechanically separated and stirred with 400 ml of distilled water at room temperature for at least 24 hours or until completely defibered. 100 ml of 0.5 N HCl were then added to this slurry and small aliquots were analysed by atomic adsorption spectrometry for magnesium ions over a period of several weeks. The analytical results indicate that the quantity of magnesium leached out increased in all cases as the square root of time. But, as indicated in Table 3, the time required to leach out equivalent amounts of magnesium was from 3 to 6 times longer for the titanated fibers than for the untreated asbestos fibers. The fibers prepared as in Example 1F and mechanically separated resisted the acid leach to some extent, whereas the time required to leach out the TiO$_2$/asbestos mixture, as prepared according to the procedure outlined in Example 1G was not substantially different from that observed for untreated fibers.

TABLE 3

| Acid Leaching of Magnesium Ions | | | |
|---|---|---|---|
| Time (min.) | Example 1A | 1B | 1F |
| 0 | 0.5 | 0.6 | 1.2 |
| 25 | 2.6 | 2.2 | 5.4 |

TABLE 3-continued

| | Acid Leaching of Magnesium Ions | | |
|---|---|---|---|
| Time (min.) | Example 1A | 1B | 1F |
| 100 | 5.7 | 2.7 | 5.7 |
| 225 | 11.4 | 3.6 | 8.6 |
| 400 | 16 | 5.2 | 12.3 |
| 1369 | 21.0 | 7.1 | 16.8 |
| 2025 | | | |
| 3136 | 41.2 | 12.6 | |
| 4225 | | | 42.5 |
| 5625 | | | 50.5 |
| 7225 | 78.4 | 23.8 | |
| 10,000 | | 30.2 | 66.6 |
| 13,225 | | 37.2 | |
| 17,161 | | 45.9 | |

EXAMPLE 3

Chrysotile asbestos fibers (Grade 4 Quebec Asbestos Mining Association) were mechanically separated and 1.0 g samples were added to Teflon bottles containing 50 g of a 0%, 20%, 30% and 40%, KOH solution respectively. 1.0 g of identical fibers but modified according to the procedure of Example 1B were similarly added to Teflon ® bottles containing 50 g of a 0%, 20%, 30% and 40% KOH solution respectively. The bottles were placed in an autoclave at 150° C. for 100 hours before analyzing the supernatant solution for leached silicates using a colorimetric method. As indicated in Table 4 the amount of $SiO_2$ leached out increases with increasing KOH concentration but remains about 2.5 times higher for untreated asbestos fibers than for fibers treated according to the method outlined in Example 1B.

TABLE 4

| Silicate Extraction by concentrated KOH solution for 100 hours at 150° C. | | |
|---|---|---|
| KOH | % of Silicate extracted | |
| % | Natural Fibers | Titanated Fibers |
| 0 | 0.7 | 0.5 |
| 20 | 11.9 | 4.6 |
| 30 | 18.1 | 5.8 |
| 40 | 21.8 | 10.4 |

EXAMPLE 4

Four asbestos diaphragms 10 cm in diameter were prepared by vacuum deposition of a slurry of treated or untreated chrysotile asbestos fibers (Grade 3T and 4T in a weight ratio of 1:2). Diaphragm no. 1 containing 18 g of untreated fibers, Diaphragm no. 2 containing 18 g of fibers titanated according to the procedure outlined In Example 1B and Diaphragm no. 3 containing 18 g of the mixture of titanium dioxide and chrysotile prepared as outlined in Example 1G were heated at 400° C. for 60 minutes. Diaphragm no. 4 was prepared as follows:

12 g of chrysotile asbestos fibers Grade 4T and 6 g of chrysotile asbestos fibers Grade 3T were conditioned by air sparging for two hours in 1 liter NaOH 2 M. 0.8 g of chlorotrifluoroethylene polymer (HALAR ®) and 3 drops of a nonionic surfactant (TRITON ®X-100) were added to the slurry and agitation continued for another hour. The slurry was uniformlly deposited onto a perforated steel plate using a slight vacuum, dried at 110° C. for 1 hour and placed in a 270° C. oven for three hours to effect bonding.

Each diaphragm was cut into four pieces. One piece was immersed in 1 N HCl solution at a temperature of 70° C. and the results are reported in Table 5.

TABLE 5

| Diaphragm no | After 5 minutes | After 1 day | After 1 week |
|---|---|---|---|
| 1 (untreated) | disintegrated | — | no change |
| 2 (titanated) | no change | no change | no change |
| 3 (mixture) | no change | disintegrated | — |
| 4 (HALAR ®) | no change | no change | no change |

A second piece was immersed in 20% KOH at a temperature of 70° C. and the following results are reported in Table 6.

TABLE 6

| Diaphragm no. | After 1 day | After 1 week |
|---|---|---|
| 1 (untreated) | swollen | very swollen and soft |
| 2 (titanated) | no change | semi-rigid |
| 3 (mixture) | swollen | very swollen and soft |
| 4 (HALAR ®) | no change | semi-rigid |

EXAMPLE 5

The chemically modified chrysotile samples, having retained their fibrous structure, were tested for possible alterations of their haemolytic effects. Short chrysotile fibers isolated from Quebec Grade 7 asbestos were treated according to the procedure outlined in Example 1B. All comparisons were made with the untreated chrysotile samples and the tests were conducted in the following manner:

For each experiment, whole blood was obtained from the interior vena cava of two ether-anesthetized adult male Long Island rats (250–300 g/body weight). The whole blood was then immediately suspended in 400 ml of Veronal buffer solution (290±5 mOsm) of pH 7.28. Erythrocytes were washed 3 times, and a 4% by volume suspension of the rat red blood cells (RBC) was prepared in the Veronal buffer.

Weighted amounts of asbestos samples were suspended in 12.5 ml of Veronal buffer using a Dounce tube. The concentrations of fibers studied varied from 100 to 1000 µg/ml. Suspensions of dispersed fibers were placed in 30 ml Falcon flasks with 12.5 ml of the RBC suspension (final concentration of RBC: 2%). Flasks were incubated qt 37° C. in a Dunboff metabolic shaking incubator. From each test tube and control, 3 ml samples were taken after 30 minutes of incubation. Samples were centrifuged for 5 minutes to precipitate ghosts and intact RBC. One ml of supernatant was diluted with 3 ml of Veronal buffer and the absorbance was determined at 541 nm. Complete haemolysis was obtained by the addition of Triton ®X-100 to 2% suspension of RBC in distilled water, and determined as described before.

Haemolysis induced by titanated chrysotile asbestos are reported in Table 7.

TABLE 7

| Concentration of fiber | Untreated chrysotile % of Haemolysis | Titanated chrysotile |
|---|---|---|
| none | 7 | 7 |
| 100 | 26 | 21 |
| 400 | 67 | 54 |
| 1000 | 96.5 | 82 |

EXAMPLE 6A

Chlore-Alkali Cell

The laboratory cell employed on expanded wire mesh titanium metal anode covered with an oxide of ruthenium and a 9.5 cm diameter perforated steel plate cathode. A circular asbestos diaphragm as described in Example 6B was placed on the cathode and held by a 0.6 cm thick PTFE spacing ring exposing thereby an electrode and a diaphragm area of 60 cm$^2$. The anolyte was contained within a 1.5 cm cavity in a PTFE backing disk and a hollow stainless steel disk formed a 1.0 cm deep catholyte compartment. The cell was clamped together with three steel bolts and fitted with appropriate connectors for the electrolyte and gas flows. The temperatures of the cell was kept at 85°–90° C. and a variable direct current source attached to the anode and cathode.

In operation, preheated brine containing 25.5 weight percent NaCl at pH 4 was fed to the anolyte compartment at a controlled flow rate such as to maintain about 50% conversion of the NaCl in the catholyte. The cell was operated at current densities from 2.2 to 2.6 kA/m$^2$, that is to say currents from 13 to 16 amperes for a period of several weeks.

EXAMPLE 6B

Asbestos Diaphragm

Asbestos diaphragm no. 1 four inches in diameter was prepared as follows:

18 g of a mixture of chrysotile asbestos fibers Grades 4T and 3T in a 2:1 weight ratio were conditioned by air sparging for two hours in 1 liter of water containing 100 g NaOH and 150 g NaCl producing an uniform slurry. The slurry was poured into a Buchner funnel and diaphragm no. 1 formed by gravity filtration.

The diaphragm no. 2 was similarly formed using 18 g of the fiber mixture titanated as described in Example 1B using a solution of 2.9 g TiCl$_3$ neutralized to pH 3.7.

The diaphragms were mounted in the laboratory cell constructed and operated as described in Example 6A with the results given in Table 8.

TABLE 8

|  | Asbestos | | Modified Asbestos | |
|---|---|---|---|---|
| Current (A) | 14.0 | 14.9 | 13.9 | 15.0 |
| Voltage (V) | 3.78 | 3.89 | 3.60 | 3.60 |
| % Conversion | 50.9 | 50.7 | 50.9 | 53.3 |
| % NaOH efficiency | 96.5 | 91.7 | 99.0 | 95.9 |
| Flow rate (ml/min) | 2.76 | 2.84 | 2.75 | 2.71 |
| Temperature (°C.) | 90.3 | 90.0 | 83.2 | 90.2 |

EXAMPLE 7

Short chrysotile fibers isolated by floatation from Quebec Grade 7 asbestos were treated according to the procedure outlined in Example 1B and their electrophoretic mobility compared with that untreated short fibers.

The fibers were washed for five minutes in HCl 10$^{-3}$ M rinsed with 200 ml bidistilled water and filtered. A 10 mg sample was then redispersed in a 10$^{-3}$ M KCl solution by means of a Dounce tube to produce a final solution having a concentration of 200 ppm and a pH in the range pH 3 to 11. The movement of the asbestos fibers in an applied electric field was observed using a commercial Zeta meter and the results are reported in Table 9.

TABLE 9

|  | Zeta Potential | |
|---|---|---|
|  | Short Fibers | Titanated Fibers |
| pH 3.0 | 46 mV | 48 mV |
| 4.0 | 45 mV | 32 mV |
| 5.0 | 44 mv | 28 mV |
| 6.0 | 38 mV | 25 mV |
| 7.0 | 41 mV | 26 mV |
| 8.0 | 41 mV | 27 mV |
| 9.0 | 34 mV | 27 mV |
| 10.0 | 26 mV | 14 mV |
| 11.0 | 18 mV | 3 mV |

Except for the most acidic pH examined, the Zeta potential of the titanated fibers were found to be some 15 mV more negative than that of the untreated fibers.

The embodiments of the invention in which an exclusive property or privilege is claimed are defined as follows:

1. A chrysotile asbestos fiber substantially coated on its exterior surface with hydrated titanium dioxide, the titanium dioxide content being from 0.5 to 35% by weight, part of the titanium dioxide being chemically bonded to the asbestos fiber and the remaining titanium dioxide being retained by electrostatic bond, said modified fiber having an Mg:Si ratio of from less than 3:2 to 2:2 when calculated on an atomic number ratio, a Ti:Si ratio of from more than 0.2 to less than 1:2 and said modified fiber being also characterized by an infrared spectrum wherein the relative peaks at 1082, 1025 and 957 cm$^{-1}$ have been substantially altered in their intensity as compared to unmodified, natural asbestos fibers, said fiber resisting leaching of the Mg ions by strong acids 3 to 6 times better than unmodified, natural asbestos fibers and resisting leaching of SiO$_2$ groups in strong alkali media 1.5 to 3 times better than unmodified, natural chrysotile fibers.

2. A method for chemically bonding titanium dioxide to asbestos fibers which comprises
    (a) forming a slurry of opened asbestos fibers by dispersing asbestors fibers in deoxygenated water;
    (b) contacting said slurry in the absence of oxygen with a solution of trivalent titanium salt having a pH of less than 5 thereby to causing oxidation of the Ti$^{+++}$ ions to Ti$^{++++}$ ions by water catalyzed by the surface of the asbestos fibers, said step (b) resulting in the formation and bonding to the asbestos fibers of titanium dioxide.

3. The method of claim 2, wherein the pH of the titanium salt solution is adjusted to a pH of from 3 to 4.

4. The method of claim 3, wherein the trivalent titanium salt is titanium trichloride.

5. The method of claim 3, wherein the titanated asbestos fibers are formed into a mat by vacuum filtration and dried.

6. The method of claim 5, wherein the mat is heated to a temperature of less than 450° C.

* * * * *